United States Patent
Satake et al.

(10) Patent No.: US 10,374,448 B2
(45) Date of Patent: Aug. 6, 2019

(54) VEHICLE POWER SUPPLY CONTROL DEVICE

(71) Applicant: Yazaki Corporation, Tokyo (JP)

(72) Inventors: Shuuji Satake, Shizuoka (JP); Yoshihito Aoki, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 193 days.

(21) Appl. No.: 15/496,379

(22) Filed: Apr. 25, 2017

(65) Prior Publication Data

US 2017/0317515 A1    Nov. 2, 2017

(30) Foreign Application Priority Data

Apr. 28, 2016 (JP) ................. 2016-090242

(51) Int. Cl.
| | |
|---|---|
| *H02J 7/00* | (2006.01) |
| *B60R 16/02* | (2006.01) |
| *B60R 16/03* | (2006.01) |
| *B60R 16/04* | (2006.01) |
| *B60L 1/08* | (2006.01) |

(Continued)

(52) U.S. Cl.
CPC .............. *H02J 7/0068* (2013.01); *B60L 1/08* (2013.01); *B60L 1/14* (2013.01); *B60L 58/12* (2019.02); *B60R 16/0207* (2013.01); *B60R 16/03* (2013.01); *B60R 16/04* (2013.01); *H02J 1/08* (2013.01); *H02J 2007/005* (2013.01);
(Continued)

(58) Field of Classification Search
CPC .......... B60L 1/08; B60L 1/14; B60L 11/1861; H02J 1/08; H02J 7/0068; H02J 2007/005; B60R 16/0207; B60R 16/03; B60R 16/04
See application file for complete search history.

(56) References Cited

U.S. PATENT DOCUMENTS 5,991,670 A * 11/1999 Mufford .............. B60L 11/1881
180/65.1
6,127,741 A  10/2000 Matsuda et al.
(Continued)

FOREIGN PATENT DOCUMENTS

| JP | 10-271678 A | 10/1998 |
|---|---|---|
| JP | 2000-023380 A | 1/2000 |

(Continued)

OTHER PUBLICATIONS

Communication dated May 8, 2018 issued by the Japanese Patent Office in counterpart application No. 2016-090242.

*Primary Examiner* — Alfonso Perez Borroto
*Assistant Examiner* — Esayas G Yeshaw
(74) *Attorney, Agent, or Firm* — Sughrue Mion, PLLC

(57) ABSTRACT

A vehicle power supply control device includes a plurality of area power supply slaves connected with respective different device groups configured with a plurality of different devices installed in a vehicle, and controlling power supplied to the devices in the connected device groups, a plurality of area power supply masters that are connected with respective different area power supply slaves and control power supplied to the connected area power supply slaves, and a vehicle power supply master connected with the area power supply masters and a battery of the vehicle and controlling power supplied to the area power supply masters from the battery.

10 Claims, 12 Drawing Sheets

(51) Int. Cl.
  *B60L 1/14* (2006.01)
  *H02J 1/08* (2006.01)
  *B60L 58/12* (2019.01)

(52) U.S. Cl.
  CPC .......... *Y02T 10/705* (2013.01); *Y02T 10/7005* (2013.01); *Y02T 10/7044* (2013.01)

(56) References Cited

U.S. PATENT DOCUMENTS

| | | | | |
|---|---|---|---|---|
| 2007/0181083 | A1* | 8/2007 | Fulton | G06Q 30/0225 |
| | | | | 123/3 |
| 2007/0285759 | A1* | 12/2007 | Ash | B60J 3/04 |
| | | | | 359/275 |
| 2010/0222955 | A1* | 9/2010 | Chevalier | B60R 16/0231 |
| | | | | 701/31.4 |
| 2012/0007712 | A1* | 1/2012 | Tung | B60R 25/243 |
| | | | | 340/5.72 |
| 2012/0274268 | A1* | 11/2012 | Ishida | H02J 3/14 |
| | | | | 320/107 |

FOREIGN PATENT DOCUMENTS

| | | |
|---|---|---|
| JP | 2013-042563 A | 2/2013 |
| JP | 2014-024417 A | 2/2014 |
| JP | 2017-171157 A | 9/2017 |

\* cited by examiner

FIG.4
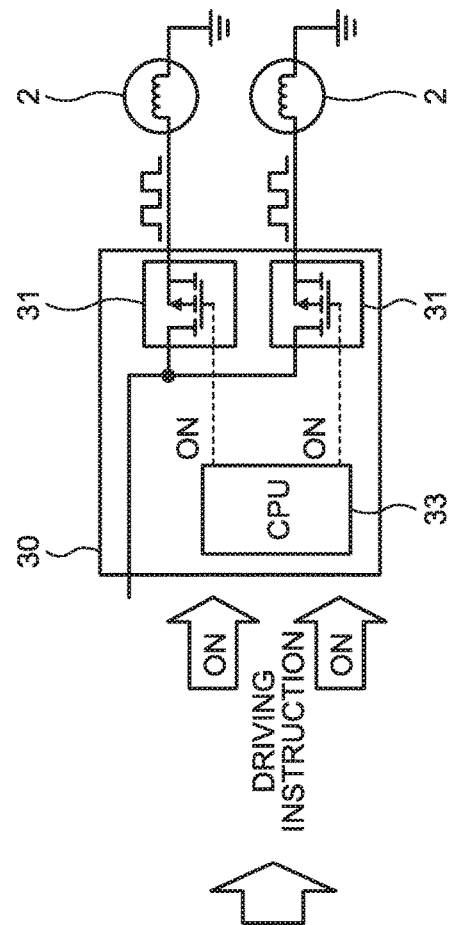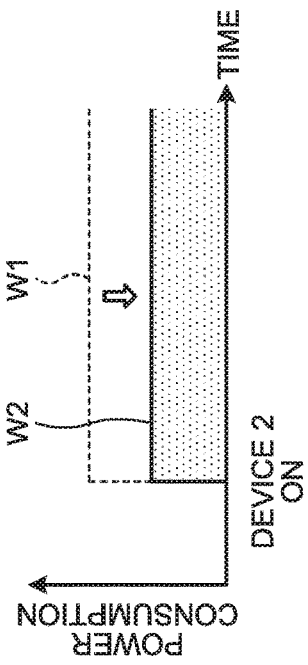
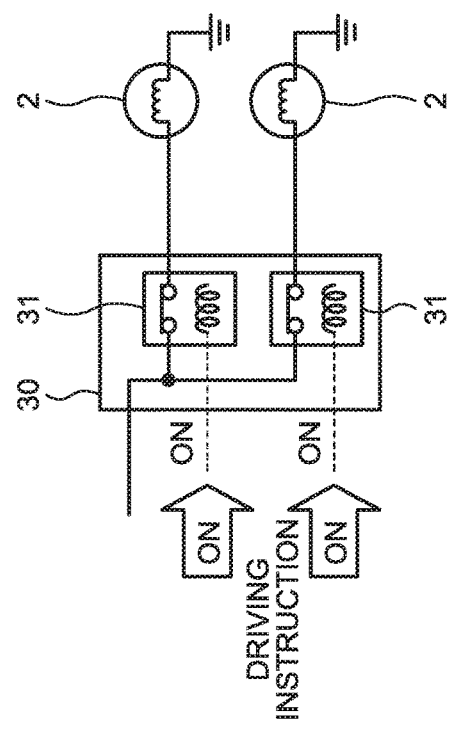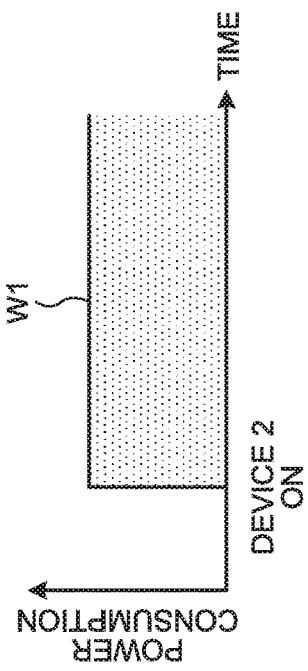

FIG.5
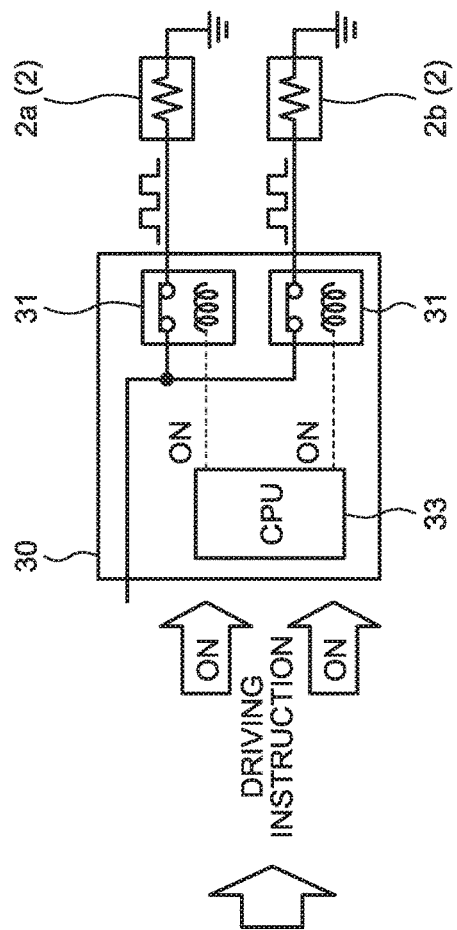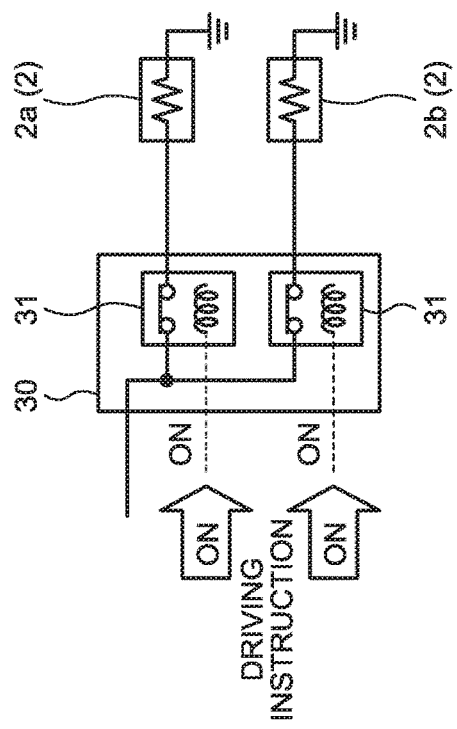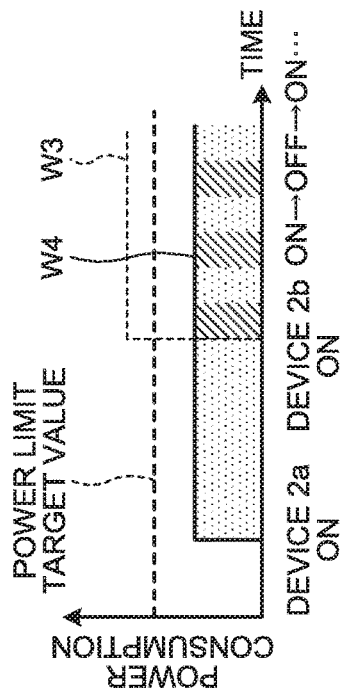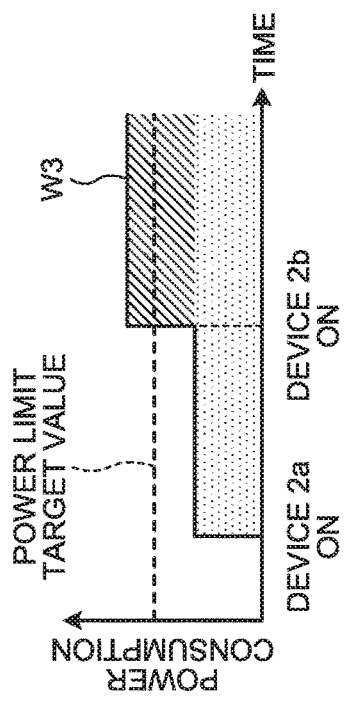

FIG.6
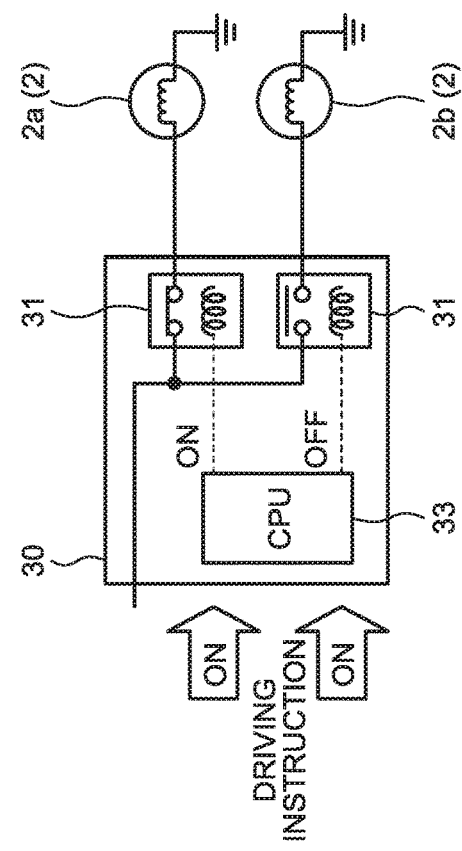
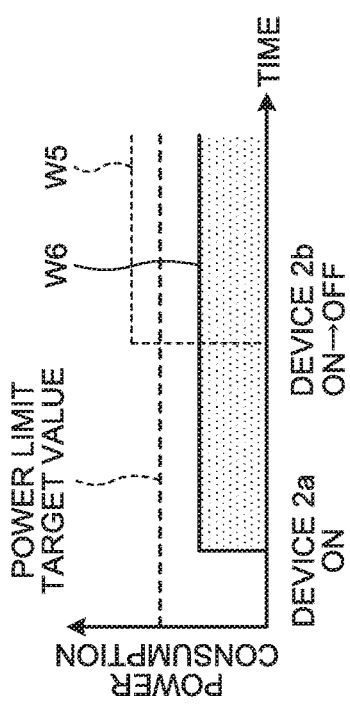
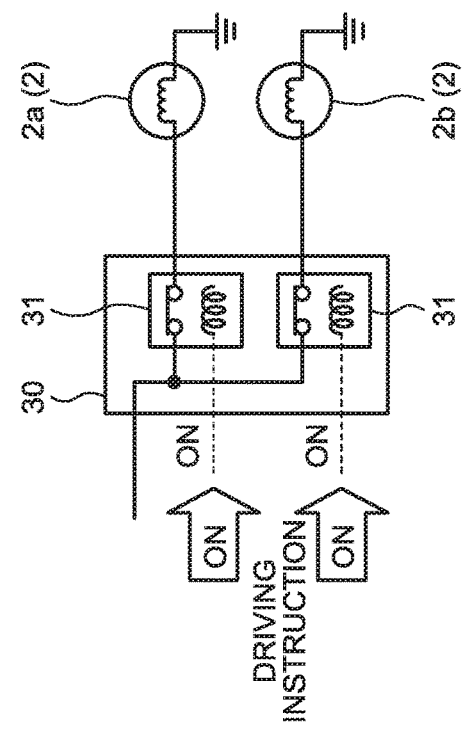
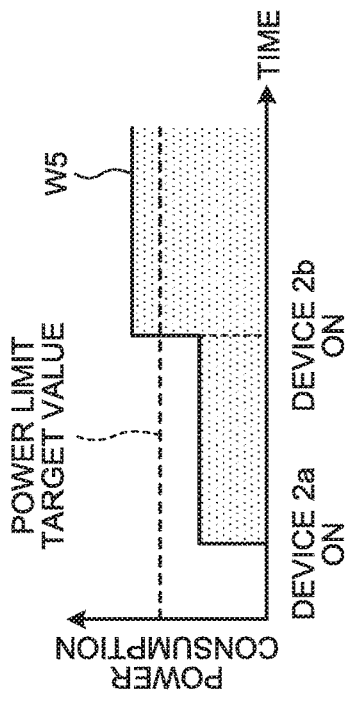

VEHICLE POWER SUPPLY CONTROL DEVICE

CROSS-REFERENCE TO RELATED APPLICATION (S)

The present application claims priority to and incorporates by reference the entire contents of Japanese Patent Application No. 2016-090242 filed in Japan on Apr. 28, 2016.

BACKGROUND OF THE INVENTION

1. Field of the Invention

The present invention relates to a vehicle power supply control device.

2. Description of the Related Art

Conventional vehicle power supply control devices each supply power of the battery to devices installed in the vehicle. For example, the vehicle power supply control device includes a plurality of power supply boxes and has a battery connected to devices through the power supply boxes. Each power supply box includes a plurality of switches, through which the devices are connected to the power supply box, and supplies power of the battery to the devices by turning on and off the switches (for example, Japanese Patent Application Laid-open No. 2013-42563).

The vehicle power supply control device, however, still needs to be improved in more appropriately supplying power to the devices on the vehicle through each of the power supply boxes.

SUMMARY OF THE INVENTION

From this viewpoint, an object of the present invention aims to provide a vehicle power supply control device capable of more appropriately supplying power to the devices on the vehicle.

In order to achieve the above mentioned object, a vehicle power supply control device according to one aspect of the present invention includes a plurality of load power supply controllers that are connected with respective different load groups configured with a plurality of different loads installed in a vehicle, and control power supplied to the loads in the connected load groups; a plurality of area power supply controllers that are connected with the respective different load power supply controllers and control power supplied to the connected load power supply controllers; and a master power supply controller that is connected with the area power supply controllers and a power supply of the vehicle and controls power supplied to the area power supply controllers from the power supply.

According to another aspect of the present invention, in the vehicle power supply control device, one of the area power supply controllers, the load power supply controllers connected to the area power supply controller, and the load groups connected to the load power supply controllers may be installed in a same predetermined vehicle area.

According to still another aspect of the present invention, in the vehicle power supply control device, the master power supply controller may set a power instruction value that limits power used by the load group for each of the area power supply controllers based on a status of the power supply and information relating to power consumption of the load groups connected to the area power supply controllers through the load power supply controller.

According to still another aspect of the present invention, in the vehicle power supply control device, the area power supply controllers may control power supplied to the load group through the load power supply controller based on the power instruction value.

According to still another aspect of the present invention, in the vehicle power supply control device, when power consumption of the load groups connected through the load power supply controllers exceeds a target value in a power limit determined based on the power instruction value, the area power supply controllers may control power consumption of the load group that does not exceed the target value with the power consumption of the load group controlled, and the area power supply controllers may request the master power supply controller to change a power limit based on the power instruction value for the power consumption of the load group that still exceeds the target value with the power consumption of the load group controlled.

According to still another aspect of the present invention, in the vehicle power supply control device, upon request of changing a power limit based on the power instruction value, the master power supply controller may lower a power limit in the area power supply controller requesting to change the power limit and enhance a power limit in an area power supply controller different from the area power supply controller requesting to change the power limit.

According to still another aspect of the present invention, in the vehicle power supply control device, the master power supply controller may set a power control mode serving as the power instruction value and controlling operation of a load in the load group for each of the area power supply controllers.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a drawing illustrating exemplary operation of the vehicle power supply control device according to the embodiment;

FIG. 5 is another drawing illustrating exemplary operation of the vehicle power supply control device according to the embodiment;

FIG. 6 is still another drawing illustrating exemplary operation of the vehicle power supply control device according to the embodiment;

DETAILED DESCRIPTION OF THE PREFERRED EMBODIMENTS

An embodiment of the present invention will now be described in detail with reference to the drawings. It should be noted that the following description of the embodiment is not intended to limit the scope of the present invention. Following structural components include what the skilled person could easily conceive of and what is substantially equivalent. Furthermore, configurations in the following description can be combined as appropriate. The configurations can be omitted, replaced, or changed in various manners without departing from the scope of the present invention.

Embodiment

Figure 1:
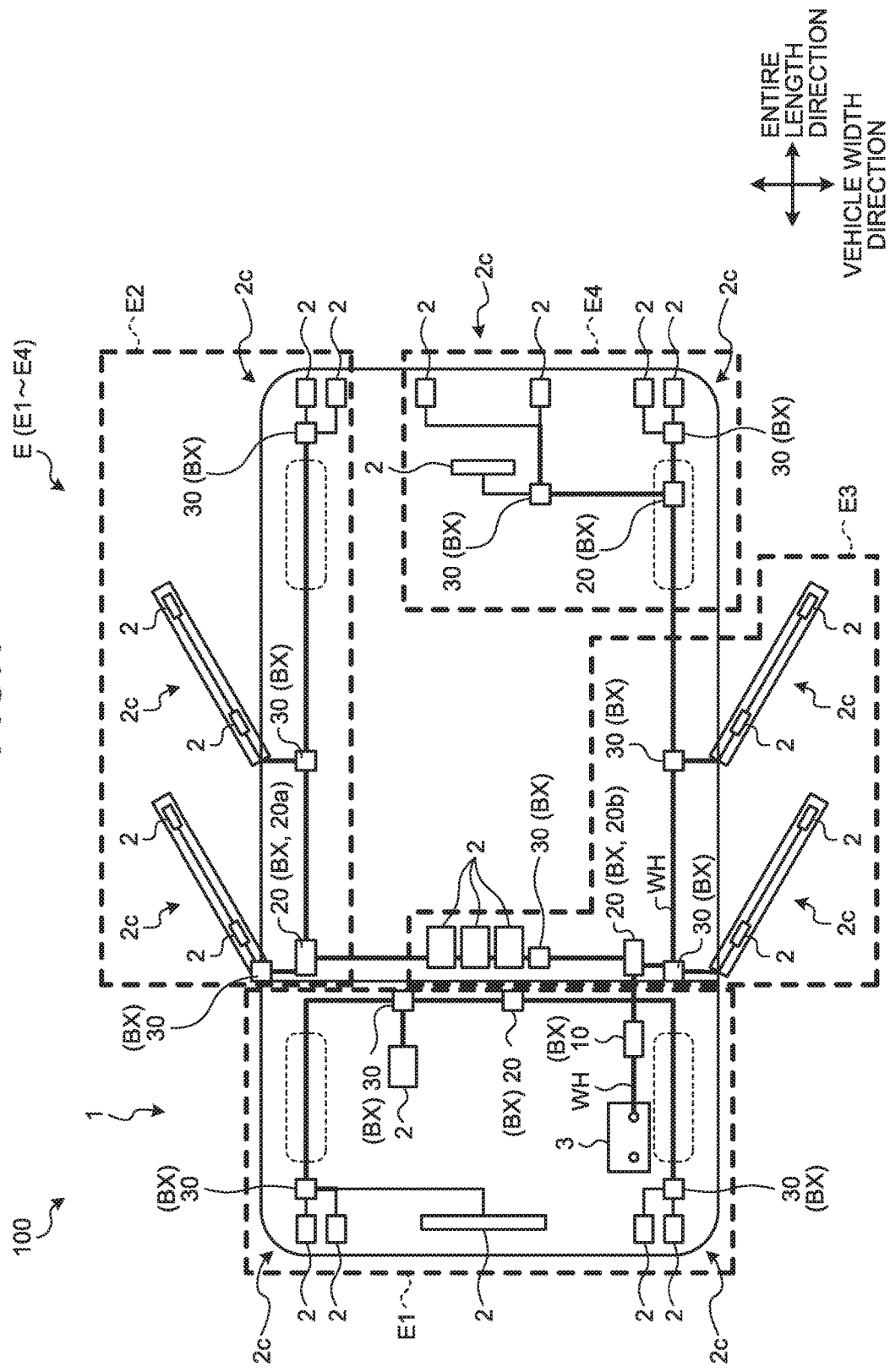
FIG. 1 is a schematic view illustrating an exemplary installation of a vehicle power supply control device according to an embodiment.

A vehicle power supply control device according to an embodiment will now be described. As illustrated in FIG. 1, a vehicle power supply control device 1 is installed on a vehicle 100 and supplies power of a battery (power supply) 3 to devices (loads) 2 installed in the vehicle 100. The vehicle power supply control device 1 includes a plurality of power supply boxes BX that have so called a tree structure and are connected to each other. The power supply boxes BX are installed in a plurality of vehicle areas E sectioned based on the assembly structure of the vehicle 100.

The vehicle areas E are sectioned in parts where a wire harness WH penetrates the body of the vehicle 100 and include an engine compartment E1, a first floor area E2, a second floor area E3, and a rear area E4. This embodiment describes the vehicle areas E as an example. The vehicle areas E may be sectioned based on the assembly structure of the vehicle 100, and the number, the configuration, the positions, and others of the vehicle areas E are not limited to this example. It is preferable that further sectioning of the vehicle 100 be determined considering routing of the wire harness WH, the number and the arrangement of power supply boxes BX, and the like based on a weight reduction, the cost, and the like.

The engine compartment E1 is an area provided in the front part in the direction of the entire length of the body of the vehicle 100. For example, the engine compartment E1 is a room sectioned by the dash panel, the inside panel, the hood, and the like and includes various kinds of devices 2 around the engine and various kinds of devices 2 such as sensors and motors relating to windshield wipers and headlights.

The first floor area E2 is an area provided in one side in the vehicle width direction between the engine compartment E1 and the rear part of the vehicle 100 along the entire length direction of the body of the vehicle 100. For example, the first floor area E2 is a room sectioned by the room floor panel, a front door, a rear door, and the like in one side in the vehicle width direction and includes various kinds of devices 2 such as switches and motors relating to control on opening and closing of the windows, the room illumination, and the like.

The second floor area E3 is an area provided in the other side in the vehicle width direction between the engine compartment E1 and the rear area E4 along the entire length direction of the body of the vehicle 100. For example, the second floor area E3 is a room sectioned by the room floor panel, the front door and the rear door in the other side in the vehicle width direction, and the like and includes various kinds of devices 2 such as switches and motors relating to control on opening and closing of the windows, the room illumination, the audio, the air conditioner (heater), the blower (blast fan), and others.

The rear area E4 is an area provided in the rear part in the entire length direction of the body of the vehicle 100. For example, the rear area E4 is a room sectioned by the trunk floor panel and others and includes various kinds of devices 2 such as sensors and motors relating to control on the rear hazard lights.

The vehicle power supply control device 1 includes a plurality of power supply boxes BX including a vehicle power supply master 10, a plurality of area power supply masters 20, and a plurality of area power supply slaves 30. These power supply boxes are installed in each vehicle area E.

Figure 2:
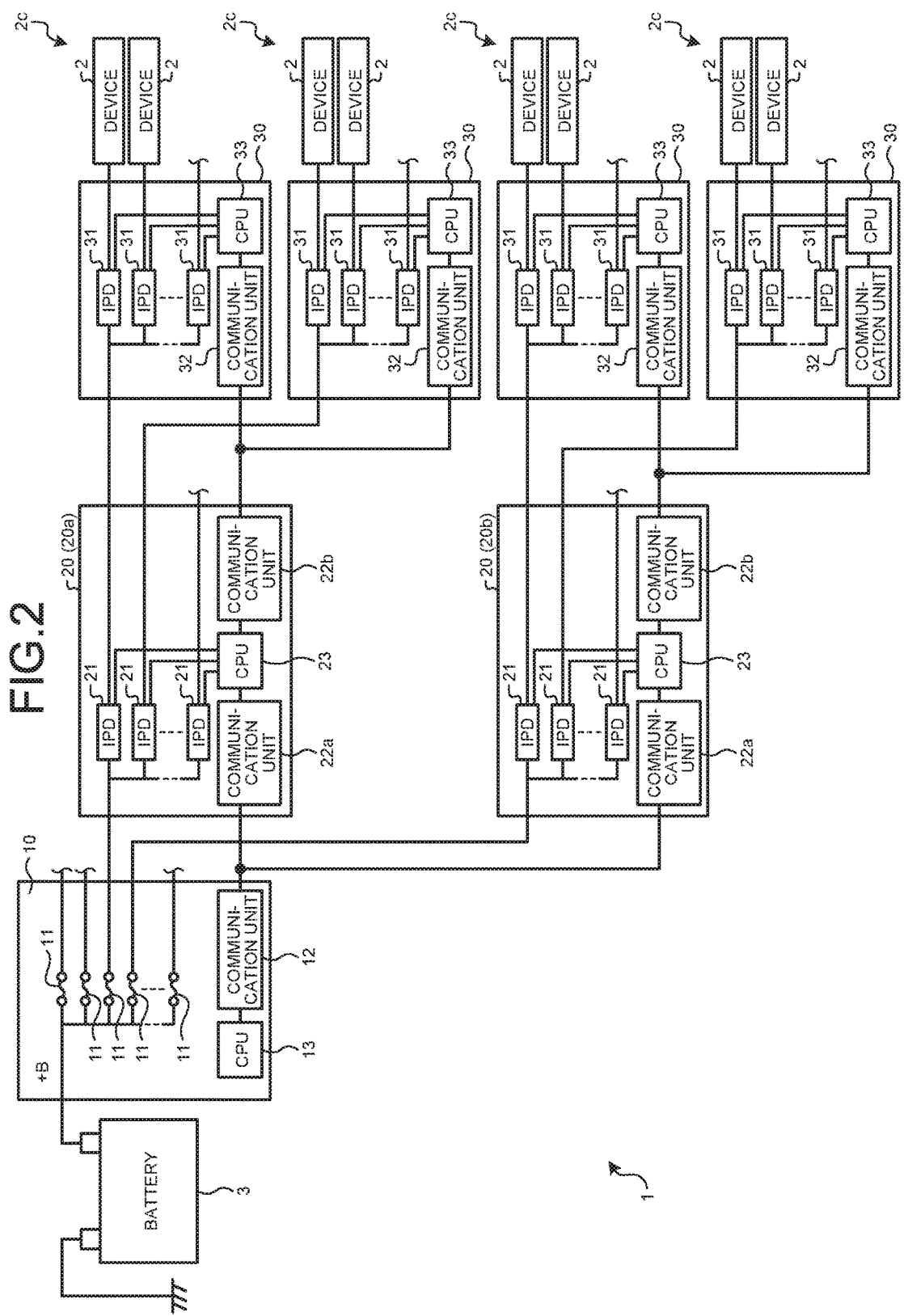
FIG. 2 is a block diagram illustrating an exemplary configuration of the vehicle power supply control device according to the embodiment.
Figure 3:
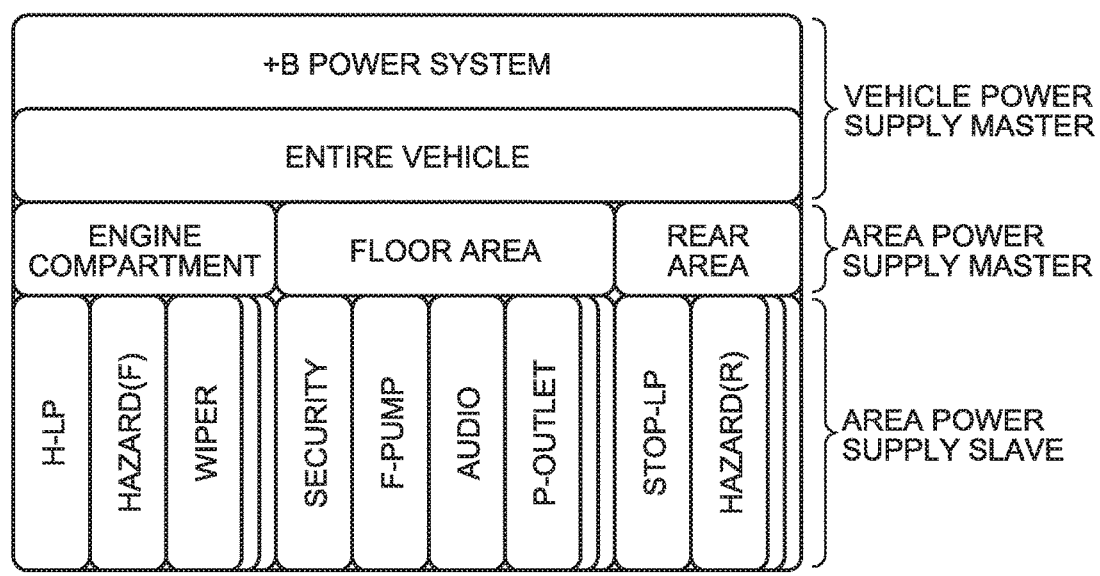
FIG. 3 is a drawing illustrating an exemplary function of the vehicle power supply control device according to the embodiment.

The vehicle power supply master 10 is a master power supply controller and controls power supply to the entire vehicle 100 and a +B power system (regular power supply) as illustrated in FIG. 3. The vehicle power supply master 10 is installed, for example, in the engine compartment E1 and connected with the area power supply masters 20 and the battery 3 of the vehicle 100 through the wire harness WH. As illustrated in FIG. 2, the vehicle power supply master 10 includes a plurality of fuses 11, a communication unit 12, and a CPU 13. Each fuse 11 is interposed between the battery 3 installed in the engine compartment E1 and the corresponding area power supply master 20. When an overcurrent flows from the battery 3 into the area power supply master 20, the fuse 11 melts and protects the circuit. The communication unit 12 is connected with the area power supply masters 20 and communicates with each of the area power supply masters 20. The CPU 13 is connected with the communication unit 12 and controls power supplied from the battery 3 to each area power supply master 20. For example, the CPU 13 controls each area power supply master 20 based on the status of the battery 3 and information relating to the power consumption output from the area power supply master 20. The status of the battery 3 is determined based on the state of charge (SOC, the charging rate) of the battery 3, power generated by a power generator such as an alternator, and power consumed by the vehicle 100. The battery 3 is charged by the power generation of the alternator and discharged through power consumption of the devices 2 on the vehicle 100. In the battery 3, the SOC increases when the power generation exceeds the power consumption in the vehicle 100 and decreases when the power generation lowers the power consumption in the vehicle 100. The status of the battery 3 is determined based on the SOC and the charge and discharge of the battery 3. In another case, the status of the battery 3 may be determined only based on the SOC. The CPU 13 sets a power instruction value for limiting power used in the vehicle area E for each area power supply master 20 based on the status of the battery 3 and information relating to the power consumption in the area power supply master 20. The CPU 13 may calculate the power instruction value based on signals from another system relating to power control, the ECU, and the like. The battery 3 may be charged through non-contact power feeding such as electromagnetic induction and magnetic resonance.

Each of the area power supply masters 20 is an area power supply controller and controls power supply to the area power supply slaves 30 disposed in the corresponding vehicle area E (the engine compartment, the floor areas, and the rear area) as illustrated in FIG. 3. The area power supply master 20 is connected with area power supply slaves 30 different from one another and disposed in the corresponding vehicle area E through the wire harness WH. For example, the area power supply master 20 is installed in each of the engine compartment E1, the first floor area E2, the second floor area E3, and the rear area E4. The area power supply master 20 is connected with the area power supply slaves 30 installed in the same vehicle area E. For example, the area power supply master 20 installed in the first floor area E2 is connected with the area power supply slaves 30 installed in the first floor area E2. As illustrated in FIG. 2, the area power supply master 20 includes a plurality of intelligent power devices (IPD, a semiconductor relay) 21, communication units 22*a* and 22*b*, and a CPU 23. Each IPD 21 is interposed between the vehicle power supply master 10 and the corresponding area power supply slave 30. The IPD 21 is an integrated circuit with functions such as a switch function for having the current on and off, a control function for controlling a pulse width modulation (PWM), and various protection functions for protecting the device from overheat, overcurrent, and the like. For example, the CPU 23 controls the on-off operation of the IPD 21, and each IPD passes or stops current flowing from the vehicle power supply master 10 to the corresponding area power supply slave 30. The communication unit 22*a* is connected to the vehicle power supply master 10 and communicates with the vehicle power supply master 10. The IPD 21 may be a mechanical relay contact. The communication unit 22*b* is connected with the area power supply slaves 30 and communicates with each of the area power supply slaves 30. The CPU 23 is connected with the communication units 22*a* and 22*b* and the IPDs 21 and controls power supplied to the area power supply slaves 30 based on a power instruction value given from the vehicle power supply master 10. For example, the CPU 23 provides the on-off control and the PWM control on the IPDs 21 based on the power instruction value and limits currents flowing into the area power supply slaves 30.

Each of the area power supply slaves 30 is a load power supply controller and controls power supplied to the devices 2 including headlights and rear hazard lights as illustrated in FIG. 3. The area power supply slaves 30 are connected with respective different device groups (load groups) 2*c* configured with a plurality of different devices 2 installed in the vehicle 100, through the wire harnesses WH. For example, several area power supply slaves 30 are installed in each of the engine compartment E1, the first floor area E2, the second floor area E3, and the rear area E4. The area power supply slave 30 is connected with an area power supply master 20 and a plurality of devices 2 installed in the same vehicle area E. For example, the area power supply slave 30 installed in the first floor area E2 is connected with an area power supply master 20 and a plurality of devices 2 installed in the same first floor area E2. The area power supply slave 30 is connected with the devices 2 disposed on the periphery thereof. The area power supply slave 30 includes a plurality of IPDs (or relay contacts) 31, a communication unit 32, and a CPU 33. Each IPD 31 is interposed between the area power supply master 20 and the corresponding device 2. The CPU 33 controls the on-off operation of the IPDs 31, and each IPD 31 passes or stops the current flowing from the area power supply master 20 to the corresponding device 2. The IPD 31 is a semiconductor relay, but may be a mechanical relay contact. The IPD 31 is referred to as a relay contact as appropriate. The communication unit 32 is connected to the area power supply master 20 and communicates with the area power supply master 20. The CPU 33 is connected with the communication unit 32 and the IPDs 31 and controls power supplied to the devices 2 based on the control from the area power supply master 20. For example, the CPU 33 provides the on-off control and the PWM control on each IPD 31 based on the control from the area power supply master 20 and controls currents flowing into the devices 2. In this manner, as illustrated in FIG. 3, the vehicle power supply control device 1 is configured in a tree structure with the vehicle power supply master 10 controlling overall power consumption in the vehicle 100, the area power supply masters 20 that control power consumption of the devices 2 connected to each of the area power supply slaves 30, and the area power supply slaves 30 each controlling power consumption of the connected devices 2.

Exemplary operation of the vehicle power supply control device 1 will now be described. In this example, the vehicle power supply control device 1 provides controls for reducing the power consumption of the devices 2. The controls include a power saving control that controls the devices 2 with a lower power, a power reduction control that reduces power for the devices 2, and a priority control that controls power in order of priority of the devices 2.

The power saving control will now be described. In the comparative example of FIG. 4, in the vehicle power supply control device 1, when the area power supply slave 30 supplies power to the devices 2 by keeping the respective relay contacts on, the devices 2 use power consumption W1. Compared to this configuration, in the vehicle power supply control device 1, when the area power supply slave 30 provides PWM controls on the IPDs 31 and supplies power to the devices 2, the devices 2 use power consumption W2 smaller than the power consumption W1 (the power saving control). This configuration allows the vehicle power supply control device 1 to control the devices 2 including light bulbs into appropriate brightness using the power saving control, for example.

The power reduction control will now be described. In the comparative example of FIG. 5, in the vehicle power supply control device 1, when the area power supply slave 30 supplies power to devices 2*a* and 2*b* by keeping the respective relay contacts 31 on, the devices 2*a* and 2*b* use power consumption W3. Compared to this configuration, in the vehicle power supply control device 1, when the area power supply slave 30 provides on-off controls on the relay contacts 31 and supplies power to the respective devices 2*a* and 2*b*, the devices 2*a* and 2*b* use power consumption W4 smaller than the power consumption W3 (the power reduction control). For example, the vehicle power supply control device 1 provides the power reduction control by alternately turning on and off the two relay contacts 31 and supplying power to the devices 2*a* and 2*b*. This configuration allows the vehicle power supply control device 1 to lower the power consumption W4 of the devices 2*a* and 2*b* than a target value (a power limit target value) in power limits determined based on the power instruction value.

The priority control will now be described. In the comparative example of FIG. 6, in the vehicle power supply control device 1, when the area power supply slave 30 supplies power to the devices 2a and 2b by keeping the respective relay contacts 31 on, the devices 2a and 2b use power consumption W5. Compared to this configuration, in the vehicle power supply control device 1, when the area power supply slave 30 supplies power only to the device 2a by turning on the relay contact 31 of the device 2a of higher priority and turning off the relay contact 31 of the device 2b of lower priority, the device 2a uses power consumption W6 smaller than the power consumption W5 (the priority control). This configuration allows the vehicle power supply control device 1 to lower the power consumption W6 of the devices 2a and 2b than the power limit target value.

Figure 7:
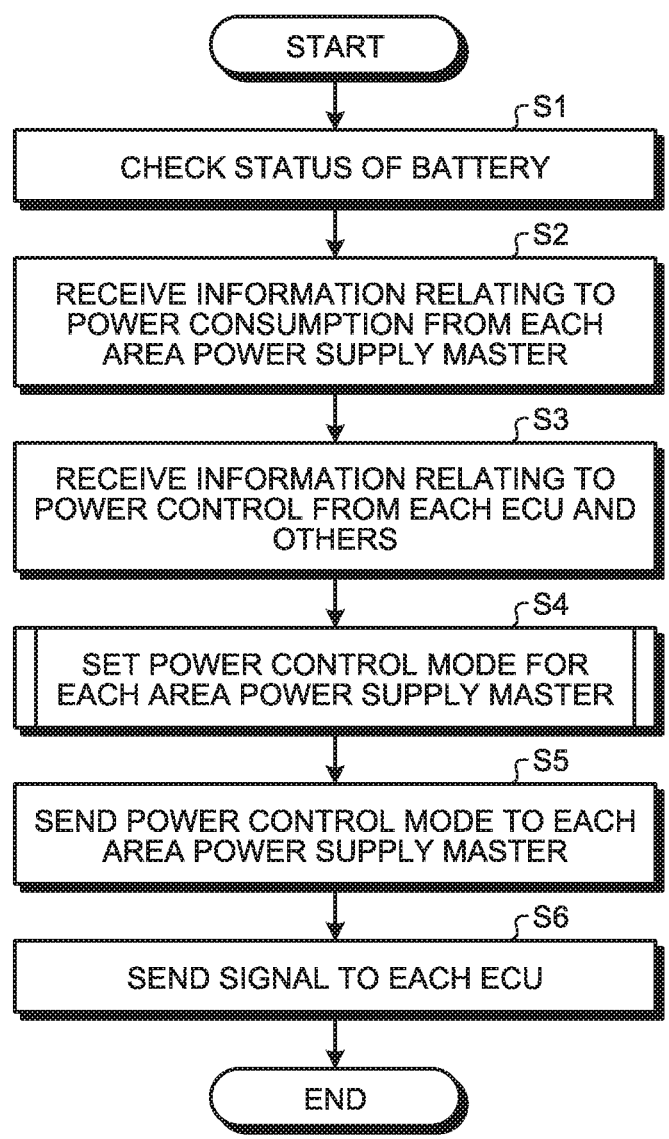
FIG. 7 is a flowchart illustrating exemplary operation of a vehicle power supply master according to the embodiment.

Exemplary operation of the vehicle power supply master 10 will now be described with reference to a flowchart. As illustrated in FIG. 7, the vehicle power supply master 10 checks the status of the battery 3 of the vehicle 100 (Step S1). For example, the vehicle power supply master 10 checks the SOC of the battery 3 and further checks charge and discharge of the battery 3 based on the power generation by the power generator and the overall power consumption in the vehicle 100. The vehicle power supply master 10 receives information relating to the power consumption from the area power supply masters 20 (Step S2). The vehicle power supply master 10 receives information relating to the power control from another system, the ECUs, and the like (Step S3). The vehicle power supply master 10 thereafter sets a power control mode, which serves as a power instruction value, for controlling operation of the devices 2 for each area power supply master 20 (Step S4). The power control mode is a mode for controlling the power of the battery 3 by controlling the operation of the devices 2, and modes 0 to 5 are used in this case. The mode 0 is a mode without power limits on the devices 2, whereas the modes 1 to 5 are modes with power limits on the devices 2. For example, in the modes 1 to 5, the power limit on the device 2 is further enhanced in accordance with an increase in the mode number. In other words, in the modes 1 to 5, the mode 1 has the lowest power limit on the device 2, whereas the mode 5 has the highest power limit on the device 2. The vehicle power supply master 10 sets any of modes 0 to 5 for each of the area power supply masters 20, for example, based on the SOC of the battery 3. A method of setting the power control modes will be later described in detail. The vehicle power supply master 10 sends the set power control mode to each of the area power supply masters 20 (Step S5). The vehicle power supply master 10 further sends signals to the ECUs (Step S6) and completes the processing.

Figure 8:
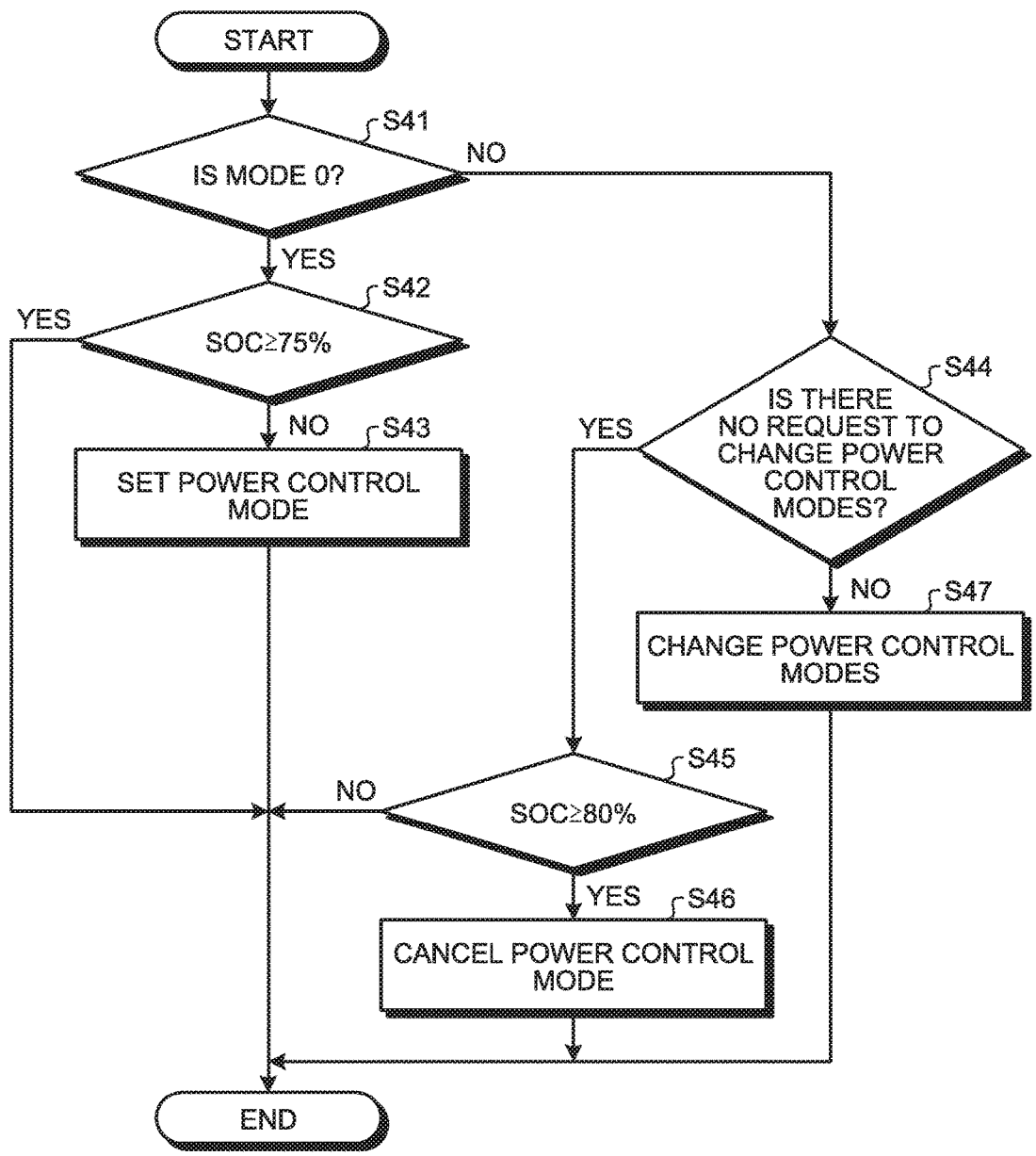
FIG. 8 is another flowchart illustrating exemplary operation of the vehicle power supply master according to the embodiment.

A method (the content of processing in the above-described Step S4) of setting a power control mode for each of the area power supply masters 20 will now be described in detail. As illustrated in FIG. 8, the vehicle power supply master 10 determines whether the mode of the power control modes is set to zero (0) (Step S41). If the power control mode is set to the mode 0 having no power limits (Step S41; Yes), the vehicle power supply master 10 determines whether the SOC of the battery 3 is equal to or greater than 75% (Step S42). If the vehicle power supply master 10 determines that the SOC of the battery 3 is equal to or greater than 75% (Step S42; Yes), the vehicle power supply master 10 completes the processing with the power control mode kept to the mode 0. Because the battery 3 is sufficiently charged in the mode 0 providing no power limits on the devices 2, the vehicle power supply master 10 maintains the mode 0 and provides no power limits.

In above-described Step S42, if the vehicle power supply master 10 determines that the SOC of the battery 3 is less than 75% (Step S42; No), the vehicle power supply master 10 sets a mode n (n=1 to 5) of the power control modes based on the SOC of the battery 3 and limits the power (Step S43). For example, if the SOC of the battery 3 is equal to or greater than 65% and less than 75%, the vehicle power supply master 10 sets the mode 1 of the power control modes. If the SOC of the battery 3 is less than 65%, the vehicle power supply master 10 sets any of the modes 2 to 5 of the power control modes as appropriate based on the SOC of the battery 3. In this manner, the vehicle power supply master 10 can limit the power when the SOC of the battery 3 is relatively small. In the above-described Step S42, the vehicle power supply master 10 may determine which power control mode to be set considering the balance between the power consumption of the vehicle 100 and the power generation by the power generator. For example, if the power consumption is larger than the power generation with the SOC of the battery 3 less than 75% (Step S42; No), the vehicle power supply master 10 sets a mode n (n=1 to 5) of the power control modes and limits the power.

In Step S41, if the power control mode is not set to the mode 0 having no power limits (Step S41; No), the vehicle power supply master 10 determines whether the area power supply masters 20 request to change the power control modes (Step S44). If no area power supply masters 20 request to change the power control modes (Step S44; Yes), the vehicle power supply master 10 determines whether the SOC of the battery 3 is equal to or greater than 80% (Step S45). If the SOC of the battery 3 is equal to or greater than 80% (Step S45; Yes), the battery 3 is sufficiently charged and the vehicle power supply master 10 therefore cancels the power control mode (Step S46). For example, the vehicle power supply master 10 changes the mode of the power control modes to zero (0) and completes the processing. If the SOC of the battery 3 is less than 80% (Step S45; No), the battery 3 is insufficiently charged. The vehicle power supply master 10 therefore keeps the power control mode in the current mode n (n=1 to 5) and completes the processing.

In Step S44, when requesting a change of the power control modes from an area power supply master 20 (Step S44; No), the vehicle power supply master 10 changes the power control modes (Step S47). For example, the vehicle power supply master 10 lowers the power limit in an area power supply master 20a (see FIG. 2) requesting to change the power control modes and enhances the power limit in an area power supply master 20b (see FIG. 2) different from the area power supply master 20a. More specifically, the vehicle power supply master 10 sets a mode n−1 where "1" is subtracted from the mode n of the power control modes for the area power supply master 20a and sets a mode n+1 where "1" is added to the mode n of the power control modes for the area power supply master 20b. This process allows the vehicle power supply master 10 to maintain the SOC of the battery 3 while supplying necessary power to the area power supply masters 20. The request of changing the power control modes will be later described in the exemplary operation of the area power supply master 20.

Figure 9:
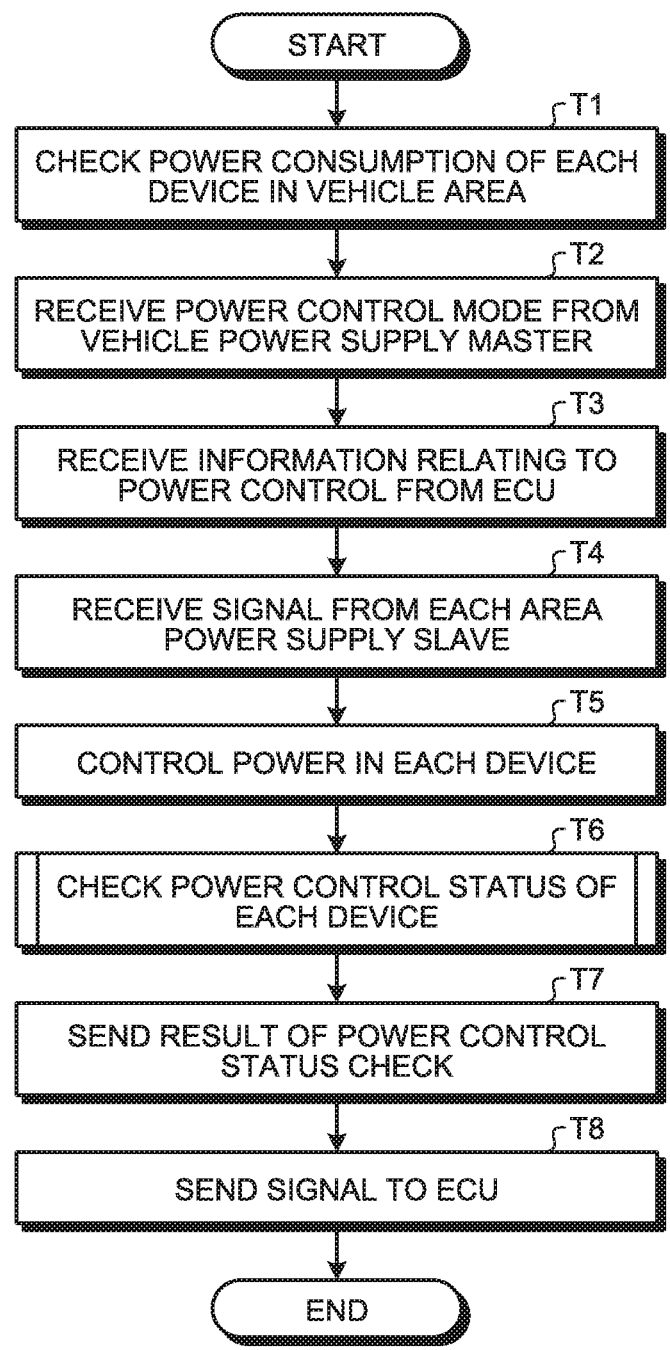
FIG. 9 is a flowchart illustrating exemplary operation of an area power supply master according to the embodiment.

Exemplary operation of each of the area power supply masters 20 will now be described. As illustrated in FIG. 9, the area power supply master 20 checks the power consumption of the devices 2 connected through the area power supply slaves 30 in the vehicle area E (Step T1). For example, the area power supply master 20 checks the power consumption of the devices 2 in the vehicle area E based on signals output from the area power supply slaves 30, the ECU in the vehicle area E, and the like. The area power supply master 20 receives a power control mode from the vehicle power supply master 10 (Step T2). For example, the area power supply master 20 receives any of modes 0 to 5. The area power supply master 20 further receives information relating to the power control from the ECU (Step T3). The area power supply master 20 further receives signals from the area power supply slaves 30 (Step T4). For example, the area power supply master 20 receives a signal from an area power supply slave 30 when the area power supply slave 30 has a request to another area power supply slave 30. The area power supply master 20 controls power in the devices 2 connected through the area power supply slave 30 (Step T5). For example, the area power supply master 20 controls power to be supplied to the devices 2 through the area power supply slave 30 based on any of the modes 0 to 5 of the power control modes. The area power supply master 20 checks the status of power control in the devices 2 connected through the area power supply slave 30 (Step T6). For example, the area power supply master 20 checks the status of power control based on the power consumption of the devices 2 connected through the area power supply slave 30 and a target value (a power limit target value) in power limits determined based on the power instruction value. The method how the area power supply master 20 checks the status of power control will be described later. The area power supply master 20 sends a result of the power control status check to the vehicle power supply master 10 (Step T7). The area power supply master 20 sends a signal to the ECU (Step T8) and completes the processing.

Figure 10:
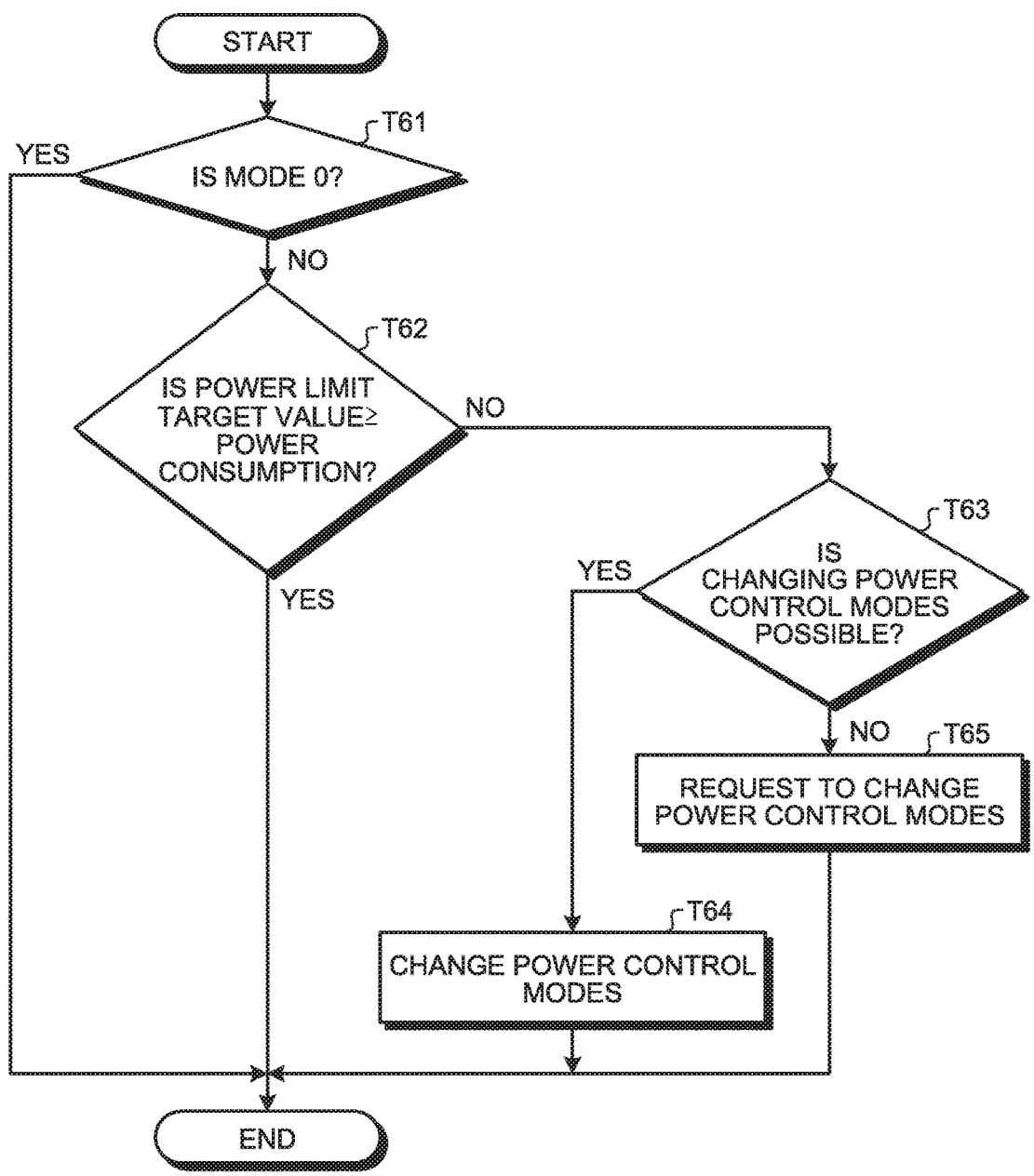
FIG. 10 is another flowchart illustrating exemplary operation of the area power supply master according to the embodiment.
Figure 11:
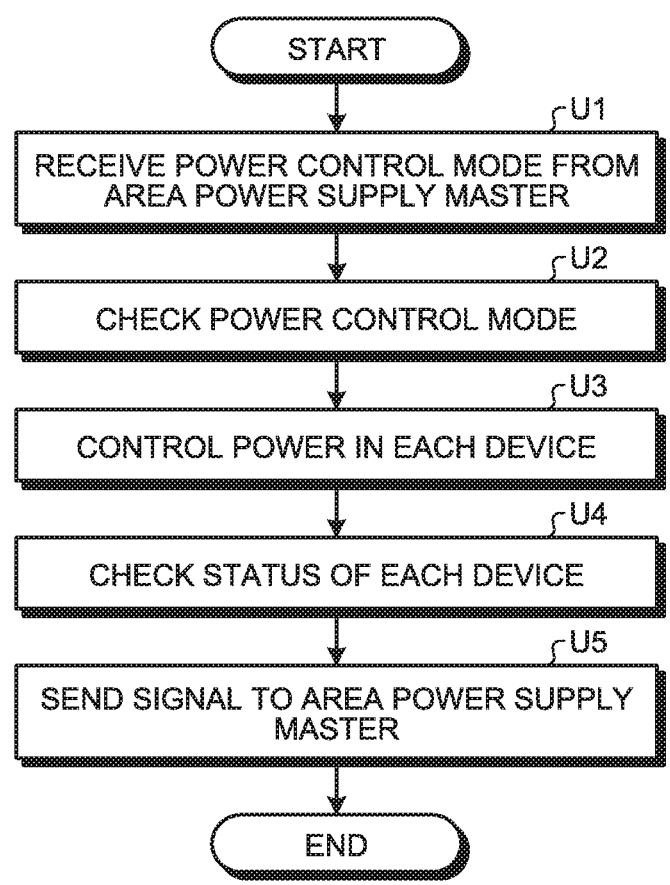
FIG. 11 is a flowchart illustrating exemplary operation of an area power supply slave according to the embodiment.

Following is detailed description relating to the method (the content of processing in the above-described Step T6) as to how each of the area power supply masters 20 checks the power control statuses in the devices 2. As illustrated in FIG. 10, the area power supply master 20 determines whether the power control mode is set to the mode zero (0) (Step T61). If the power control mode is set at the mode 0 (Step T61; Yes), no power limits are provided on the devices 2. The area power supply master 20 therefore completes the processing. If the power control mode is not set to the mode 0 (Step T61; No), the area power supply master 20 determines whether the power consumption by the devices 2 connected through the area power supply slaves 30 is equal to or less than the power limit target value (Step T62). If the power consumption of the devices 2 connected through the area power supply slaves 30 is equal to or less than the power limit target value (Step T62; Yes), the area power supply master 20 has no necessity of controlling power in the devices 2. The area power supply master 20 therefore completes the processing. If the power consumption of the devices 2 connected through the area power supply slaves 30 in the vehicle area E exceeds the power limit target value (Step T62; No), the area power supply master 20 determines whether changing the power control modes is possible (Step T63). For example, the area power supply master 20 determines whether it is possible to reduce the power consumption of the devices 2 in the vehicle area E to the level equal to or less than the power limit target value by changing the power control modes and enhancing the power limit for the devices 2 in the vehicle area E. If the area power supply master 20 can change the power control modes (Step T63; Yes), it changes the power control modes (Step T64). For example, the area power supply master 20 adds "1" to the mode n (n=1 to 5) of the power control modes and changes the power control modes. In this manner, the area power supply master 20 lowers the power consumption of the devices 2 in the vehicle area E and completes the processing. If the area power supply master 20 cannot change the power control modes (Step T63; No), it requests the vehicle power supply master 10 to change the power control modes (Step T65). For example, if the power consumption of the devices 2 in the vehicle area E exceeds the power limit target value because the vehicle area E includes a device 2 on which a power limit cannot be provided due to its high priority, the area power supply master 20 requests the vehicle power supply master 10 to change the power control modes and lower the power control and completes the processing. The priority placed on the devices 2 is an order in limiting the power. Higher priority is placed on the devices 2 relating to safety such as headlights of the vehicle 100, whereas lower priority is placed on the devices 2 relating to comfort such as the air conditioner of the vehicle 100. If a power limit is applicable in the vehicle area E, the area power supply master 20 provides a power limit in the vehicle area E. On the other hand, if no power limits are applicable in the vehicle area E, the area power supply master 20 requests the vehicle power supply master 10 to change the power control modes.

Exemplary operation of each of the area power supply slaves 30 will now be described. The area power supply slave 30 receives a power control mode from the area power supply master 20 (Step U1) and checks the power control mode (Step U2). For example, the area power supply slave 30 checks if the power control mode is set to a mode n (n=0 to 5). The area power supply slave 30 controls the power in the devices 2 based on the power control mode (Step U3). For example, if the power control mode is set to any of modes 1 to 5, the area power supply slave 30 limits the power to be supplied to the corresponding device 2. If the power control mode is set to the mode 0, the area power supply slave 30 does not limit the power to be supplied to the corresponding device 2. Specifically, when the power control mode is any of modes 1 to 5, the area power supply slave 30 provides the above-described power saving control, power reduction control, or priority control and reduces the power consumption of the devices 2. The area power supply slave 30 thereafter checks the statuses of the devices 2 (Step U4). For example, the area power supply slave 30 checks, using signals from SWs, sensors, the ECU, or the like disposed nearby, if the control target extends to a device 2 in another area power supply slave 30 or another vehicle area E. The area power supply slave 30 sends a signal to the area power supply master 20 (Step U5) and completes the processing. For example, if the control target extends to a device 2 in another area power supply slave 30 or another vehicle area E, the area power supply slave 30 transmits a signal to the device 2 in another area power supply slave 30 or another vehicle area E through the area power supply master 20 by sending a signal to the area power supply master 20. The area power supply slave 30 thereafter completes the processing.

Examples of the Power Control Modes

Examples of the modes 1 to 5 of the power control modes will now be described. For example, the mode 1 is a mode for an intermittent control on the heater and for a control on the room illumination. The mode 3 is a mode for stopping the blower (the blast fan). The mode 5 is a mode for stopping the air conditioner and the heater. The mode 2 is a mode relating to power limits and provided between the mode 1 and the mode 3, and the mode 4 is a mode relating to power limits and provided between the mode 3 and the mode 5, examples of which are omitted. In modes 1 to 5, the power limit on the device 2 is enhanced with an increase in the mode number.

Setting the Power Control Modes by Combining Scenes of the Vehicle

Followings are examples of setting a power control mode by combining vehicle scenes of the vehicle 100. Examples of the vehicle scene include an environmental factor affecting the vehicle 100 and a factor relating to the operation of the vehicle 100. For example, four factors define the vehicle scene, which are brightness outside the vehicle 100, the climate, the presence or absence of passengers, and the travel status. The brightness outside the vehicle 100 is detected by, for example, an illuminance sensor. The climate is acquired by, for example, an information terminal of the vehicle 100 communicable with a server storing climate information through wireless communication. The passengers are detected by, for example, load sensors installed to seats on the vehicle 100. Examples of the travel status include a stop state and a travel state of the vehicle 100, and the travel status is detected by various kinds of sensors.

In above-described Step S5, the vehicle power supply master 10 sends a power control mode and a factor defining the vehicle scene to each area power supply master 20. In above-described Step T5, the area power supply master 20 provides a power limit preliminarily set based on each combination of the vehicle scene and the power control mode. As an example of the combination of the vehicle scene and the power control mode, when the vehicle scene is set at "dark (night)" as the brightness, "rain" as the climate, "only driver" as the passengers, "stop" as the travel status, in the power control modes, the mode 0 represents a mode without power limits, the mode 1 represents a mode for intermittently controlling the heater and illuminating only the driver seat, the mode 3 represents a mode for stopping the blower and intermittently controlling the windshield wipers, and the mode 5 represents a mode for stopping the air conditioner and turning off the headlights. The mode 2 is a mode relating to power limits and provided between the mode 1 and the mode 3, and the mode 4 is a mode relating to power limits and provided between the mode 3 and the mode 5, examples of which are omitted. In this manner, the area power supply master 20 can set the optimal power control mode based on the vehicle scene. For example, when it is raining with the power control mode set at the mode 3, the area power supply master 20 provides an intermittent control on the windshield wipers and other controls. The power is therefore appropriately limited according to the vehicle scene.

Setting the Power Control Modes by Combining the Vehicle Area and the Vehicle Scene Followings are examples of setting a power control mode by combining the vehicle area E and the vehicle scene. In the above-described Step S5, the vehicle power supply master 10 sends a power control mode and a factor defining the vehicle scene to each area power supply master 20. In the above-described Step T5, the area power supply master 20 instructs to control power on the vehicle 100 based on the vehicle scene and the power control mode. A vehicle scene and a power control mode corresponding to the vehicle scene are combined for each vehicle area E. For example, in the second floor area E3 including the passenger seat, when the vehicle scene is set to "dark (night)" as the brightness, "rain" as the climate, "only driver" as the passengers, and "stop" as the travel status, in the power control modes, the mode 0 represents a mode without power limits, the mode 1 represents a mode for turning on the room illumination, the mode 3 represents a mode for stopping the blower, and the mode 5 represents a mode for stopping the air conditioner and canceling power supply to the seats and the doors. The mode 2 is a mode relating to power limits and provided between the mode 1 and the mode 3, and the mode 4 is a mode relating to power limits and provided between the mode 3 and the mode 5, examples of which are omitted. In this manner, a vehicle scene and a power control mode corresponding to the vehicle scene are combined for each vehicle area E, and each area power supply master 20 can set the optimal power control mode for the vehicle area E based on the vehicle scene. For example, when only a driver is on board with the power control mode set into the mode 1, the area power supply master 20 in the second floor area E3 turns off the room illumination in the second floor area E3 corresponding to the passenger seat side, thereby appropriately limiting the power.

A plurality of vehicle areas E and the respective power control modes for the vehicle areas E may be combined on each vehicle scene. For example, when only a driver is on board, the vehicle power supply master 10 increases a mode of the power control modes in each vehicle area E except the first floor area E2 including the driver seat and limits the power. When it is raining at night, the vehicle power supply master 10 increases a mode of the power control modes in each vehicle area E except the engine compartment E1 including the windshield wipers and the headlights and limits the power.

As described above, the vehicle power supply control device 1 according to the embodiment includes the plurality of area power supply slaves 30 connected with the respective different device groups 2c configured with the plurality of different devices 2 installed in the vehicle 100, and controlling power supplied to the devices 2 in the connected device groups 2c, the plurality of area power supply masters 20 that are connected with the respective different area power supply slaves 30 and control power supplied to the connected area power supply slaves 30, and the vehicle power supply master 10 connected with the area power supply masters 20 and the battery 3 of the vehicle 100 and controlling power supplied to the area power supply masters 20 from the battery 3. This configuration allows the vehicle power supply control device 1 to have separate power supply routes from the battery 3 to the devices 2, thereby selectively supplying power only to the device 2 in need of power. The vehicle power supply control device 1 is capable of adjusting power supplied to the devices 2 on each area power supply master 20. With this configuration, the vehicle power supply control device 1 can appropriately supply power to the devices 2, which can therefore reduce the power consumption of the devices 2.

The vehicle power supply control device 1 is configured with three layers of power supply boxes BX (the vehicle power supply master 10, the area power supply masters 20, and the area power supply slaves 30) in what is called a tree structure. The size of each power supply box BX can be reduced by having separate power supply boxes BX. The power supply boxes BX are therefore easily installed in the vehicle 100. Furthermore, in the vehicle power supply control device 1, each device 2 is connected to an area power supply slave 30 disposed nearby. Even when the number of devices 2 is increased, this configuration can facilitate arrangement of the wire harness WH and reduce the weight of the wire harness WH. With a reduction in the weight, the vehicle power supply control device 1 can improve the fuel efficiency of the vehicle 100. In the vehicle power supply control device 1, with the area power supply masters 20, power for the devices 2 can be controlled on a vehicle area E basis. The vehicle power supply master 10 therefore has no necessity of recognizing operation of each device 2.

Because of this arrangement, the configuration of the vehicle power supply master 10 can be shared between the devices. For example, various types of vehicle power supply masters 10 can be prepared for the vehicle power supply control device 1 based on the power consumption in each area power supply master 20, the number of area power supply masters 20, the number of area power supply slaves 30, and the like.

In the vehicle power supply control device 1, one of the area power supply masters 20, the plurality of area power supply slaves 30 connected to the area power supply master 20, and a plurality of device groups 2c connected to the respective area power supply slaves 30 are installed in the same predetermined vehicle area E. This configuration enables the vehicle power supply control device 1 to further facilitate arrangement of the wire harness WH and to further reduce the weight of the wire harness WH.

In the vehicle power supply control device 1, the vehicle power supply master 10 sets a power instruction value for limiting power used by the device groups 2c for each area power supply master 20 based on the status of the battery 3 and information relating to the power consumption of the device groups 2c connected to the area power supply master 20 through the area power supply slaves 30. With this configuration, the vehicle power supply control device 1 can control power consumption in each area power supply master 20 and simplify the control on the vehicle power supply master 10.

In the vehicle power supply control device 1, each area power supply master 20 controls power supplied to the device groups 2c through the respective area power supply slaves 30 based on the power instruction value. In the vehicle power supply control device 1 in this configuration, each area power supply master 20 can control power consumption of the device groups 2c, which can save operation of the vehicle power supply master 10 controlling power consumption of the device groups 2c.

In each area power supply master 20 of the vehicle power supply control device 1, when power consumption of the device groups 2c connected to the area power supply master 20 through the area power supply slaves 30 exceeds a target value in power limits determined based on a power instruction value, the area power supply master 20 controls power consumption of the device groups 2c that does not exceed the target value with the power consumption of the device groups 2c controlled. The area power supply master 20 requests the vehicle power supply master 10 to change the power limits based on the power instruction values for the power consumption of the device groups 2c that still exceeds the target value with the power consumption of the device groups 2c controlled. In this manner, the vehicle power supply control device 1 can control the power consumption of the devices 2 in the device groups 2c connected to the area power supply master 20 through the area power supply slaves 30 within the range of the power limit target value.

In the vehicle power supply control device 1, upon request of changing power limits based on the power instruction values, the vehicle power supply master 10 lowers the power limit in the area power supply master 20 requesting to change the power limits and enhances the power limit in another area power supply master 20 different from the area power supply master 20 requesting to change the power limits. In this manner, the vehicle power supply control device 1 can maintain the total value of power consumption by the area power supply masters 20 at a constant level.

In the vehicle power supply control device 1, the vehicle power supply master 10 sets a power control mode serving as a power instruction value for controlling operation of the devices 2 in the device groups 2c for each of the area power supply masters 20. In the vehicle power supply control device 1, each area power supply master 20 can therefore control operation of the devices 2 in the device groups 2c connected to the respective area power supply slaves 30 based on the power control mode.

Modification

Modification of the embodiment will now be described. In the above-described embodiment, the vehicle power supply master 10 limits power by setting a power control mode for each of the area power supply masters 20. The vehicle power supply master 10 may limit power by using the amount of power instead of using the power control modes. For example, the vehicle power supply master 10 limits power by setting the amount of in-area power usable in the vehicle area E for each area power supply master 20. In this case, the area power supply master 20 controls the devices 2 in the device groups 2c connected through the respective area power supply slaves 30 based on the amount of in-area power. For example, the area power supply master 20 distributes usable power to each area power supply slave 30 based on the amount of in-area power. The area power supply slave 30 controls the devices 2 based on the power distributed from the area power supply master 20.

Figure 12:
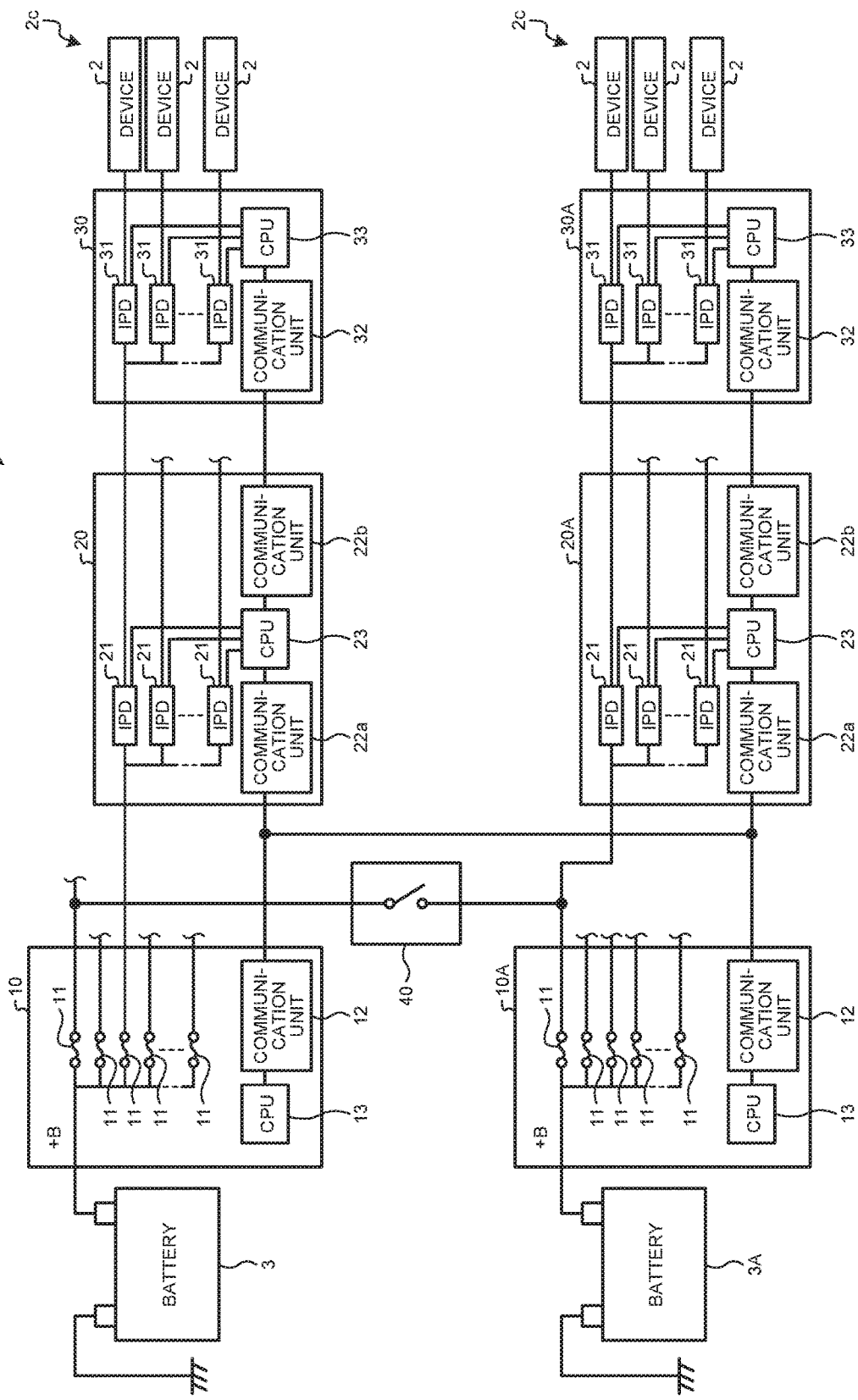
FIG. 12 is a block diagram illustrating an exemplary configuration of a vehicle power supply control device according to a modification.

The vehicle power supply control device 1 may have a plurality of batteries 3. For example, as illustrated in FIG. 12, a vehicle power supply control device 1A has two batteries 3 and 3A and is configured with two systems (the primary side and the secondary side). More specifically, the vehicle power supply control device 1A is configured with a first system (the primary side) including the battery 3, the vehicle power supply master 10, the area power supply masters 20, and the area power supply slaves 30 and a second system (the secondary side) including the battery 3A, a power supply master 10A, a plurality of area power supply masters 20A, and a plurality of area power supply slaves 30A. In the vehicle power supply control device 1A, the vehicle power supply master 10 in the primary side and the power supply master 10A in the secondary side are connected with each other through a connection switch 40 for connecting the batteries 3 and 3A. In the vehicle power supply control device 1A, the communication unit 12 of the vehicle power supply master 10 and the communication unit 12 of the power supply master 10A are connected with each other through a communication line. Furthermore, in the vehicle power supply control device 1A, when the connection switch 40 is off, the vehicle power supply master 10 controls the area power supply masters 20 in the primary side, and the power supply master 10A controls the area power supply masters 20A in the secondary side. When the connection switch 40 is on, the vehicle power supply master 10 controls the area power supply masters 20 in the primary side and controls the area power supply masters 20A in the secondary side. The vehicle power supply control device 1A further has the vehicle power supply master 10 that controls the on-off operation of the connection switch 40. The vehicle power supply control device 1A may have the power supply master 10A that controls the on-off operation of the connection switch 40. As described above, the vehicle power supply control device 1A according to the modification has two batteries 3 and 3A and is configured with two systems. The vehicle power supply control device 1A separately controls the primary side and the secondary side or controls the primary side and the secondary side as a single system.

For example, when a plurality of vehicles 100 are traveling in platoons, the vehicle power supply master 10 may control power supplied to the area power supply masters 20 based on the power supplied from another vehicle 100.

As an example, the vehicle power supply control device 1 is configured with three layers including the vehicle power supply master 10, the area power supply masters 20, and the area power supply slaves 30; however, the vehicle power supply control device 1 may be configured with layers more than three.

The vehicle power supply control device according to the present embodiment includes a plurality of load power supply controllers connected with respective different load groups configured with a plurality of different loads installed in a vehicle, and controlling power supplied to the loads in the connected load groups, a plurality of area power supply controllers that are connected with respective different load power supply controllers and control power supplied to the connected load power supply controllers, and a master power supply controller connected to the area power supply controllers and a power supply of the vehicle and controlling power supplied to the area power supply controllers from the power supply. This configuration allows the vehicle power supply control device to more appropriately supply power to the devices on the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply control device, comprising:
    a plurality of load power supply controllers that are connected with respective different load groups configured with a plurality of different loads installed in a vehicle, and configured to control power supplied to the loads in the connected load groups;
    a plurality of area power supply controllers that are connected with the respective different load power supply controllers and configured to control power supplied to the connected load power supply controllers; and
    a master power supply controller that is connected with the area power supply controllers and a power supply of the vehicle and configured to control power supplied to the area power supply controllers from the power supply, wherein
    when power consumption of the load groups connected through the load power supply controllers exceeds a target value in a power limit determined based on a power instruction value, the area power supply controllers control power consumption of the load group that does not exceed the target value with the power consumption of the load group controlled, and
    the area power supply controllers request the master power supply controller to change a power limit based on the power instruction value for the power consumption of the load group that still exceeds the target value with the power consumption of the load group controlled.

2. The vehicle power supply control device according to claim 1, wherein
    one of the area power supply controllers, the load power supply controllers connected to the area power supply controller, and the load groups connected to the load power supply controllers are installed in a same predetermined vehicle area.

3. The vehicle power supply control device according to claim 2, wherein
    the master power supply controller sets a power instruction value that limits power used by the load group for each of the area power supply controllers based on a status of the power supply and information relating to power consumption of the load groups connected to the area power supply controllers through the load power supply controller.

4. The vehicle power supply control device according to claim 1, wherein
    the master power supply controller sets the power instruction value that limits power used by the load group for each of the area power supply controllers based on a status of the power supply and information relating to power consumption of the load groups connected to the area power supply controllers through the load power supply controller.

5. The vehicle power supply control device according to claim 4, wherein
    the area power supply controllers control power supplied to the load group through the load power supply controller based on the power instruction value.

6. The vehicle power supply control device according to claim 4, wherein
    the master power supply controller sets a power control mode serving as the power instruction value and controlling operation of a load in the load group for each of the area power supply controllers.

7. The vehicle power supply control device according to claim 5, wherein
    the master power supply controller sets a power control mode serving as the power instruction value and controlling operation of a load in the load group for each of the area power supply controllers.

8. The vehicle power supply control device according to claim 1, wherein
    upon request of changing a power limit based on the power instruction value, the master power supply controller lowers a power limit in the area power supply controller requesting to change the power limit and enhances a power limit in an area power supply controller different from the area power supply controller requesting to change the power limit.

9. The vehicle power supply control device according to claim 8, wherein
    the master power supply controller sets a power control mode serving as the power instruction value and controlling operation of a load in the load group for each of the area power supply controllers.

10. The vehicle power supply control device according to claim 1, wherein
    the master power supply controller sets a power control mode serving as the power instruction value and controlling operation of a load in the load group for each of the area power supply controllers.

* * * * *